(12) United States Patent
Esterberg

(10) Patent No.: US 7,448,547 B2
(45) Date of Patent: Nov. 11, 2008

(54) DECODING WITH MEMORY IN RFID SYSTEM

(75) Inventor: Aanand Esterberg, Seattle, WA (US)

(73) Assignee: IMPINJ, Inc., Seattle, WA (US)

( * ) Notice: Subject to any disclaimer, the term of this patent is extended or adjusted under 35 U.S.C. 154(b) by 27 days.

(21) Appl. No.: 11/717,477

(22) Filed: Mar. 12, 2007

(65) Prior Publication Data

US 2007/0152073 A1 Jul. 5, 2007

Related U.S. Application Data

(62) Division of application No. 10/861,073, filed on Jun. 4, 2004.

(51) Int. Cl.
*H03M 7/00* (2006.01)
*H04Q 5/22* (2006.01)
*G08B 13/14* (2006.01)
*G06K 7/00* (2006.01)
*G06K 19/00* (2006.01)
*G06K 19/06* (2006.01)

(52) U.S. Cl. .................. 235/435; 235/487; 235/492; 340/572.1; 340/10.1; 341/50

(58) Field of Classification Search .............. 235/487, 235/492, 435; 340/572.1, 10.1; 341/50
See application file for complete search history.

(56) References Cited

U.S. PATENT DOCUMENTS

| | | | |
|---|---|---|---|
| 4,087,787 A * | 5/1978 | Acampora | 714/795 |
| 4,315,272 A | 2/1982 | Vorhaus | |
| 4,479,260 A | 10/1984 | Harrop | |
| 4,611,184 A | 9/1986 | Kumar | |
| 4,783,783 A | 11/1988 | Nagai et al. | |
| 4,935,702 A | 6/1990 | Mead et al. | |
| 5,528,222 A | 6/1996 | Moskowitz et al. | |
| 5,572,226 A | 11/1996 | Tuttle | |
| 5,719,586 A | 2/1998 | Tuttle | |
| 5,793,324 A | 8/1998 | Aslanidis et al. | |

(Continued)

FOREIGN PATENT DOCUMENTS

EP 0298618 A2 1/1989

(Continued)

OTHER PUBLICATIONS

"An Overview of the Serial Digital Interface," 1994, pp. 1-28, SGS-Thomson Microelectronics.

(Continued)

*Primary Examiner*—Daniel Walsh
(74) *Attorney, Agent, or Firm*—Thelen LLP; David B. Ritchie

(57) ABSTRACT

RFID readers, RFID tags, software, and methods decode a signal received in an RFID system. From received data, a decoder determines a number of possible test series for the output. In one embodiment, the decoder uses a memory of a previous sample to derive a subsequent sample in the test series, so as to ensure that all the test series are valid. A metric is then computed for how well each test series fits the received data. The metrics are compared to select for output the test series with the best fit. In a further embodiment, at least one of the metrics is further used to determine if a collision were present.

22 Claims, 8 Drawing Sheets

U.S. PATENT DOCUMENTS

| | | | |
|---|---|---|---|
| 5,805,632 A | 9/1998 | Leger | |
| 5,825,329 A | 10/1998 | Veghte et al. | |
| 5,929,760 A | 7/1999 | Monahan | |
| 5,933,039 A | 8/1999 | Hui et al. | |
| 5,939,945 A | 8/1999 | Thewes et al. | |
| 5,952,922 A | 9/1999 | Shober | |
| 5,986,570 A * | 11/1999 | Black et al. | 340/10.2 |
| 5,995,048 A | 11/1999 | Smithgall et al. | |
| 6,043,746 A | 3/2000 | Sorrells | |
| 6,045,652 A | 4/2000 | Tuttle et al. | |
| 6,069,564 A | 5/2000 | Hatano et al. | |
| 6,091,319 A * | 7/2000 | Black et al. | 340/10.2 |
| 6,118,379 A | 9/2000 | Kodukula et al. | |
| 6,130,612 A | 10/2000 | Castellano et al. | |
| 6,130,632 A | 10/2000 | Opris | |
| 6,134,182 A | 10/2000 | Pilo et al. | |
| 6,147,605 A | 11/2000 | Vega et al. | |
| 6,147,655 A | 11/2000 | Roesner | |
| 6,166,706 A | 12/2000 | Gallagher, III et al. | |
| 6,184,841 B1 | 2/2001 | Shober et al. | |
| 6,215,402 B1 | 4/2001 | Rao Kodukula et al. | |
| 6,265,962 B1 * | 7/2001 | Black et al. | 340/10.2 |
| 6,266,362 B1 | 7/2001 | Tuttle et al. | |
| 6,268,796 B1 | 7/2001 | Gnadinger et al. | |
| 6,271,793 B1 | 8/2001 | Brady et al. | |
| 6,320,788 B1 | 11/2001 | Sansbury et al. | |
| 6,340,932 B1 | 1/2002 | Rodgers et al. | |
| 6,346,922 B1 | 2/2002 | Proctor et al. | |
| 6,357,025 B1 | 3/2002 | Tuttle | |
| 6,366,260 B1 | 4/2002 | Carrender | |
| 6,366,629 B1 | 4/2002 | Chen et al. | |
| 6,396,438 B1 | 5/2002 | Seal | |
| 6,445,297 B1 | 9/2002 | Nicholson | |
| 6,459,411 B2 * | 10/2002 | Frazier et al. | 342/455 |
| 6,476,756 B2 * | 11/2002 | Landt | 342/42 |
| 6,501,807 B1 * | 12/2002 | Chieu et al. | 375/329 |
| 6,517,000 B1 | 2/2003 | McAllister et al. | |
| 6,571,617 B2 | 6/2003 | Van Niekerk et al. | |
| 6,603,801 B1 | 8/2003 | Andren et al. | |
| 6,677,917 B2 | 1/2004 | Van Heerden et al. | |
| 6,700,491 B2 | 3/2004 | Shafer | |
| 6,701,605 B2 | 3/2004 | Huffer et al. | |
| 6,717,923 B1 | 4/2004 | Smith | |
| 6,720,930 B2 | 4/2004 | Johnson et al. | |
| D492,670 S | 7/2004 | Hung et al. | |
| D493,446 S | 7/2004 | Hung et al. | |
| 7,005,968 B1 | 2/2006 | Bridgelall | |
| 7,030,786 B2 | 4/2006 | Kaplan et al. | |
| 7,093,693 B1 * | 8/2006 | Gazdzinski | 187/384 |
| 7,123,171 B2 * | 10/2006 | Kaplan et al. | 341/50 |
| 7,357,318 B2 * | 4/2008 | Honda | 235/385 |
| 2001/0045460 A1 * | 11/2001 | Reynolds et al. | 235/385 |
| 2002/0008656 A1 | 1/2002 | Landt | |
| 2002/0039396 A1 | 4/2002 | Zalio | |
| 2002/0167405 A1 * | 11/2002 | Shanks et al. | 340/572.1 |
| 2002/0175805 A9 | 11/2002 | Armstrong et al. | |
| 2004/0008798 A1 * | 1/2004 | Tsui | 375/295 |
| 2004/0118920 A1 * | 6/2004 | He | 235/454 |
| 2004/0137844 A1 * | 7/2004 | Desjeux et al. | 455/41.1 |
| 2004/0178265 A1 * | 9/2004 | Bui et al. | 235/436 |
| 2005/0024186 A1 | 2/2005 | Friedrich | |
| 2005/0046545 A1 * | 3/2005 | Skekloff et al. | 340/5.61 |
| 2005/0055582 A1 * | 3/2005 | Bazakos et al. | 713/202 |
| 2005/0061879 A1 * | 3/2005 | Honda | 235/385 |
| 2005/0170784 A1 * | 8/2005 | Ariyoshi et al. | 455/67.13 |
| 2005/0212674 A1 | 9/2005 | Desmons et al. | |
| 2005/0223280 A1 * | 10/2005 | Bergler et al. | 714/18 |
| 2005/0225434 A1 * | 10/2005 | Diorio et al. | 340/10.4 |
| 2005/0225435 A1 * | 10/2005 | Diorio et al. | 340/10.5 |
| 2005/0253688 A1 | 11/2005 | Fukuda | |
| 2005/0269408 A1 | 12/2005 | Esterberg et al. | |
| 2005/0270185 A1 * | 12/2005 | Esterberg | 341/50 |
| 2005/0270189 A1 * | 12/2005 | Kaplan et al. | 341/50 |
| 2006/0077036 A1 * | 4/2006 | Roemerman et al. | 340/5.61 |
| 2006/0082439 A1 * | 4/2006 | Bazakos et al. | 340/5.82 |
| 2006/0109128 A1 * | 5/2006 | Barink et al. | 340/572.2 |
| 2006/0158312 A1 * | 7/2006 | Park et al. | 340/10.2 |
| 2006/0186995 A1 * | 8/2006 | Wu et al. | 340/10.1 |
| 2006/0238301 A1 * | 10/2006 | Wu et al. | 340/10.1 |
| 2006/0290508 A1 * | 12/2006 | Moutchkaev et al. | 340/572.1 |
| 2007/0001856 A1 * | 1/2007 | Diorio et al. | 340/572.1 |
| 2007/0024446 A1 | 2/2007 | Hyde et al. | |
| 2007/0046430 A1 * | 3/2007 | Yamazaki et al. | 340/10.1 |
| 2007/0095915 A1 * | 5/2007 | Crooks | 235/451 |
| 2007/0152073 A1 * | 7/2007 | Esterberg | 235/492 |
| 2007/0285237 A1 * | 12/2007 | Batra et al. | 340/572.1 |
| 2008/0018469 A1 * | 1/2008 | Volpi et al. | 340/572.1 |

FOREIGN PATENT DOCUMENTS

| | | |
|---|---|---|
| EP | 0435137 B1 | 7/1997 |
| WO | WO 01/73854 A2 | 10/2001 |

OTHER PUBLICATIONS

Jaroslav Raszka et al., "Embedded Flash Memory for Security Application in a 0.13 μm CMOS Logic Process," Digest of Technical Papers, IEEE International Solid-State Circuits Conference. Feb. 16, 2004, pp. 46-47.

Junko Yoshida, "RFID 'kill' feature aims to soothe privacy fears," EE Times, Apr. 28, 2003, 2 pgs., Issue 1267.

Stephen A. Weis et al., "Security and Privacy Aspects of Low-Cost Radio Frequency Identification Systems," pp. 1-12, Massachusetts Institute of Technology, Cambridge, Massachusetts.

Erika Jonietz, , "Tracking Privacy," Technology Review, Jul./Aug. 2004, pp. 74-75.

L. Richard Carley, "Trimming Analog Circuits Using Floating-Gate Analog MOS Memory," IEEE Journal of Solid-State Circuits, Dec. 24, 1989, pp. 1569-1575, No. 6, New York.

* cited by examiner

1000-B

1000-C

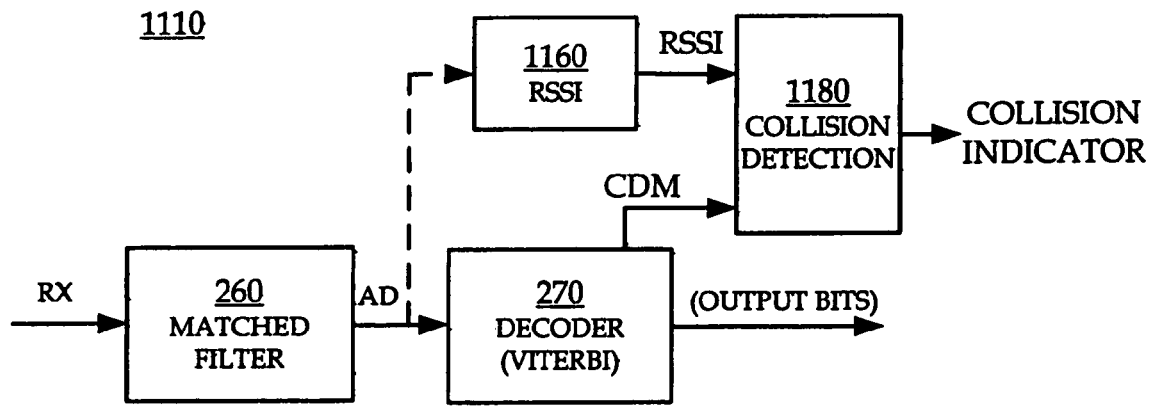
FIGURE 11
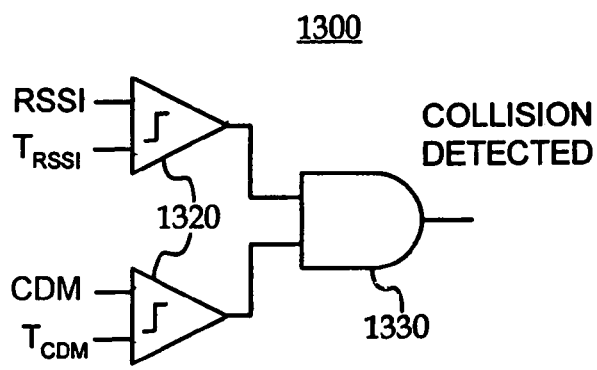
FIGURE 12
FIGURE 13

DECODING WITH MEMORY IN RFID SYSTEM

CROSS-REFERENCE TO RELATED APPLICATIONS

This application is a divisional of U.S. patent application Ser. No. 10/861,073, entitled "Decoding with Memory in RFID System," filed Jun. 4, 2004.

FIELD OF THE INVENTION

The present invention is related to the field of Radio Frequency IDentification (RFID) tags, and more specifically to RFID readers, tags, software and methods for decoding more accurately the received signal.

BACKGROUND

Radio Frequency IDentification (RFID) tags can be used in many ways for locating and identifying objects that they are attached to. RFID tags are particularly useful in product-related and service-related industries for tracking large numbers of objects are being processed, inventoried, or handled. In such cases, an RFID tag is usually attached to individual items, or to their packages.

In principle, RFID techniques entail using a device called an RFID reader to interrogate one or more RFID tags. Interrogation is performed by the reader transmitting a Radio Frequency (RF) wave. A tag that senses the interrogating RF wave responds by transmitting back another RF wave, a process known as backscatter. Backscatter may take place in a number of ways. The response may further encode a number stored internally in the tag. The response, and the number if available, is decoded by the reader, which thereby identifies, counts, or otherwise interacts with the associated item. The number can denote a serial number, a price, a date, a destination, other attribute(s), any combination of attributes, and so on.

An RFID tag typically includes an antenna system, a radio section, a logical section, and a memory. Advances in semiconductor technology have miniaturized the electronics so much that an RFID tag can generate the backscatter while powered by only the RF signal it receives, enabling some RFID tags to operate without a battery.

A challenge in the operation of RFID systems arises in decoding the received signal. This is a problem both when tags are receiving from readers, and also when readers are receiving from tags. Reception is hampered by factors of the environment, such as distance, which diminishes the signal available to work with, orientation of antennas, and so on. Reception is further hampered by interference, i.e. when other RF signals are also transmitted in the vicinity at the same time. Interfering RF signals may be generated, for example, from nearby wireless devices such as other RFID readers, and also cellular telephones, personal digital assistants, and the like.

BRIEF SUMMARY

The invention improves over the prior art.

Briefly, the present invention provides RFID readers, RFID tags, software, and methods for decoding a received signal in an RFID system to minimize effects of poor reception. From received data, a decoder determines a number of possible test series for the output. In one embodiment, the decoder may use a memory of a previous sample to derive a subsequent sample in the test series, so as to ensure that all the test series are valid. A metric is then computed for how well each test series fits the received data. The metrics are compared to select for output the test series with the best fit.

In a further embodiment, at least one of the metrics is further used to determine if a collision were present.

The invention offers the advantage that poorer reception and more interference can be tolerated, thus extending the range of RFID systems.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 11 is a block diagram according to another embodiment of the invention.

FIG. 12 is a truth table for a module of the diagram of FIG. 11.

FIG. 13 is a diagram of a circuit for implementing the truth table of FIG. 12.

DETAILED DESCRIPTION

Figure 1:
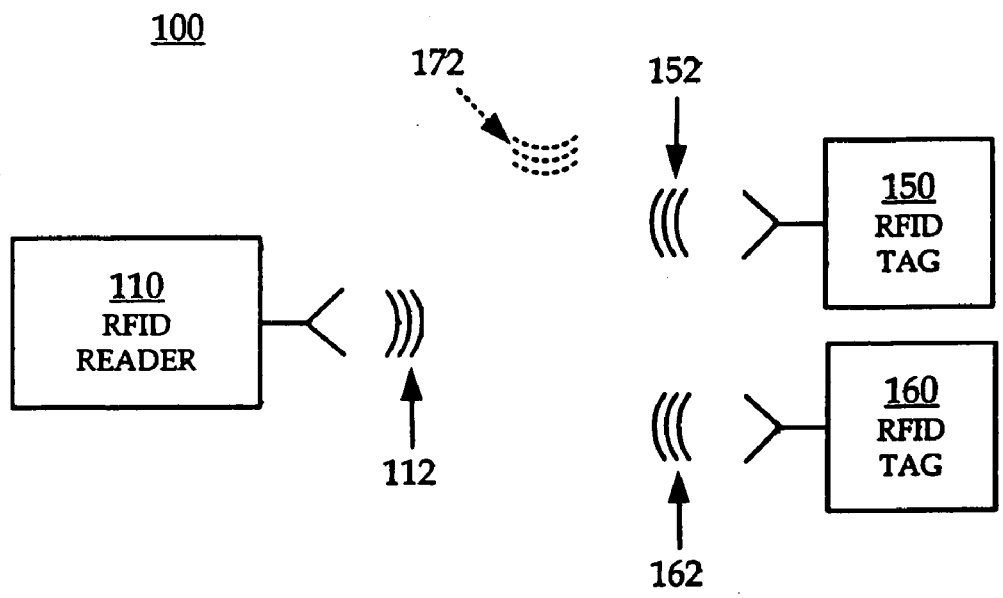
FIG. 1 is a diagram of an RFID system according to embodiments of the invention.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. This description is, therefore, not to be taken in a limiting sense.

As has been mentioned, the present invention provides RFID readers, RFID tags, software, and methods for decoding a received signal in an RFID system to minimize effects of poor reception. The invention is now described in more detail.

FIG. 1 is a diagram of an RFID system 100 according to embodiments of the invention. System 100 includes RFID reader 110, which may or may not be implemented according to the invention. System 100 additionally includes two RFID tags 150, 160, which may or may not be implemented according to the invention. At least one of RFID reader 110 and RFID tags 150, 160 is implemented according to the invention.

RFID reader 110 transmits an interrogation wave 112. RFID tags 150, 160 respond with waves 152, 162, respectively. In some instances, only one of RFID tags 150, 160 responds. In other instances, RFID tags 150, 160 respond simultaneously, which is a phenomenon that is also known as collision.

In all instances, an additional interfering wave 172 may be present, which is also received by the devices of system 100. Wave 172 may be generated, for example, from nearby wireless devices such as other RFID readers, and also cellular telephones, personal digital assistants, and the like.

Figure 2:
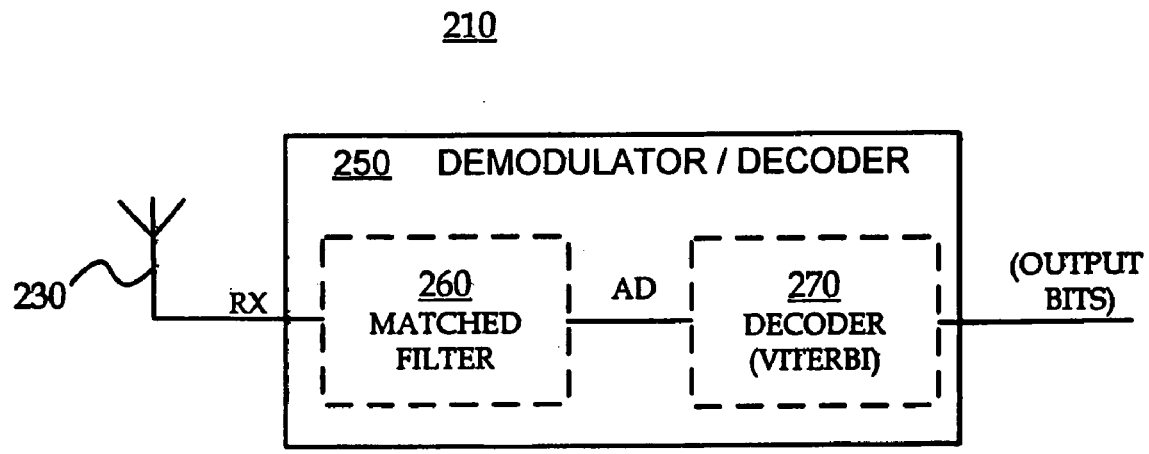
FIG. 2 is a block diagram of a receiving channel of an RFID reader and/or RFID tag according to embodiments of the invention.

FIG. 2 is a block diagram of a receiving channel 210 of an RFID reader and/or RFID tag according to embodiments of the invention. For example, receiving channel 210 could be implemented in any one of RFID reader 110 and RFID tags 150, 160.

Receiving channel 210 includes an antenna 230 to receive a wireless signal RX, and a demodulator/decoder 250 to reproduce output bits from received signal RX. Demodulator/decoder 250 includes a matched filter 260 to derive a sequence of analog signal data AD from the wireless signal RX. Demodulator/decoder 250 also includes a decoder 270 to generate the output bits from analog signal data AD, as described in more detail below.

Decoder 270, preferably implemented as a Viterbi decoder, is capable of generating at least two test series of successive samples, in an attempt to match the received data. The samples may be implemented in any convenient form to correspond to the analog data; for example they may be pulses, waveform segments, numbers, and so on.

The test series preferably meet preset validity criteria. In fact, it is preferred that decoder 270 be implemented with a memory of a previous sample for constructing a valid subsequent sample, such as a Viterbi decoder. This way the test series will be valid, as is explained in more detail below, and by example.

Decoder 270 is further adapted to compare the test series, and to select one of them for outputting. In the preferred embodiment, the selected test series is the one with the best fit with the sequence of analog data.

In one embodiment, decoder 270 is adapted to compute a distance metric for each of the test series with respect to the sequence, and to compare them for the best fit. One of the metrics is selected based on the comparison, and thus the test series corresponding to the selected metric is also selected. This selection by computation is also explained in more detail below, and by example.

Figure 3:
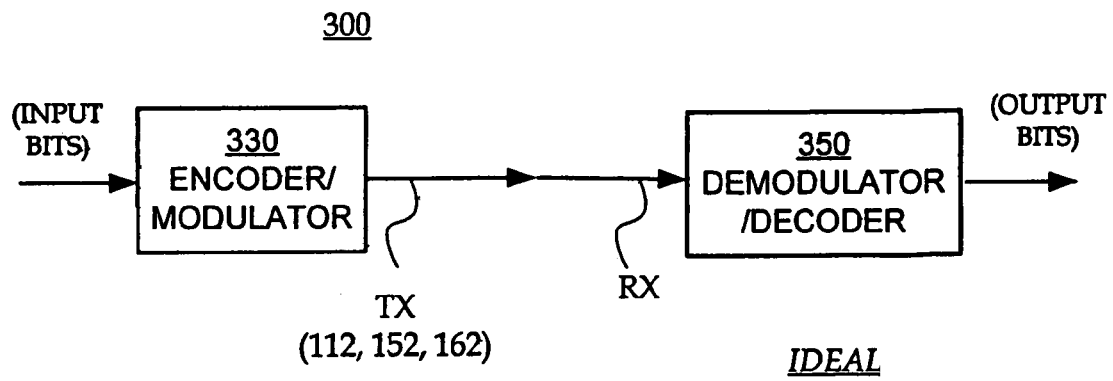
FIG. 3 is a diagram illustrating a model of idealized transmission and reception for the system of FIG. 1.

FIG. 3 is a diagram illustrating a model 300 of idealized transmission and reception for the system of FIG. 1. At the transmission side, input bits are received in an encoder/modulator 330 of the transmitting device, which then transmits a signal TX. Applied to the system of FIG. 1, signal TX could be any one of waves 112, 152, 162. At the reception side, a signal RX is received, which again could correspond to any one of waves 112, 152, 162. Signal RX is received in a demodulator/decoder 350 of the receiving device, which then generates the output bits. The idea of the transmission is that the output bits match the input bits.

A number of schemes may be used for encoding the various symbols that are intended to be transmitted, such as "0", "1", "VIOLATION", and so on. A number of such schemes are designed so that a symbol may be transmitted in a different way, depending on its predecessor symbol. This way, other objectives of RFID transmission are met, which are beyond the scope of this description.

One such scheme is described below, which is also known as FM0 coding. While all of the following examples in this document use the FM0 symbol encoding scheme, such is by example and not by limitation. Other schemes may equivalently be used for practicing the invention.

Figure 4A:
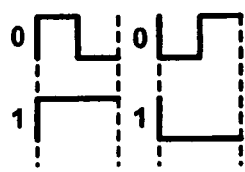
FIG. 4A illustrates the FM0 method for coding symbols in sequences for the transmission and reception of FIG. 3.

FIG. 4A illustrates the FM0 scheme for coding symbols in sequences for the transmission and reception of FIG. 3. Two possible waveforms are given for the symbol "0", and two for the symbol "1".

Figure 4B:
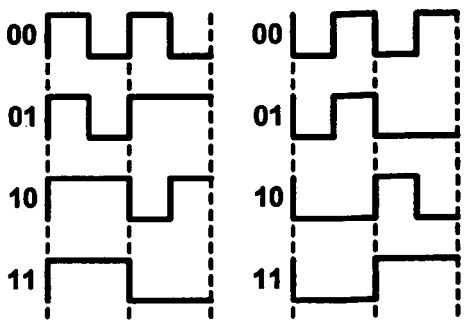
FIG. 4B illustrates examples to decide which of the waveforms of FIG. 4A are used in which case.

FIG. 4B gives examples to illustrate which of the waveforms of FIG. 4A is used in which case. It will be understood that the symbol choice depends on how the previous symbol terminates, low or high. For example, across the top row, two ways are shown for transmitting "00". Different waveforms are used for the second "0", because the waveform of the previous symbol ends differently: it ends at a low in the waveform on the left, and at a high in the waveform on the right.

Figure 5:
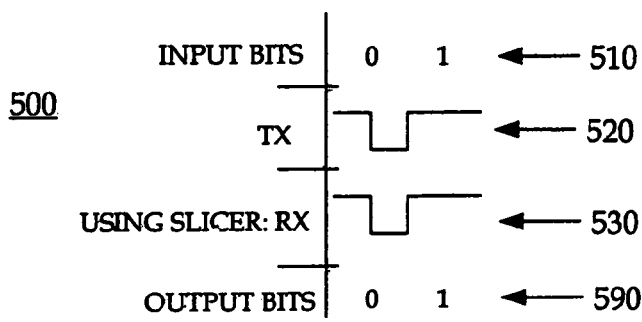
FIG. 5 is a table showing how input bits are transmitted and received to become output bits according to the model of FIG. 3, and using the sample method for coding of FIG. 4A and FIG. 4B.

FIG. 5 is a table 500 showing how input bits are transmitted and received to become output bits according to the model of FIG. 3. Input bits "01" (sequence 510) are transmitted as signal TX, given by waveform 520, using the FM0 coding method of FIG. 4A. In fact, it will be recognized that the example of waveform 520 is also shown in FIG. 4B (first column, second row). Signal TX is received as signal RX, to which a slicer may be applied by demodulator/decoder 350 to generate waveform 530. In the case of table 500, it will be appreciated that waveform 530 is similar to transmitted waveform 520. It should be noted that waveform 530 is a representation. For example, waveform 530 may be an actual waveform of a signal, but also be implemented by samples that can be represented by it, such samples being discrete signals, or a series of numbers, and so on. Then waveform 530 may be used to generate a series 590 of output bits, which is the same as sequence 510 of the input bits.

Figure 6:
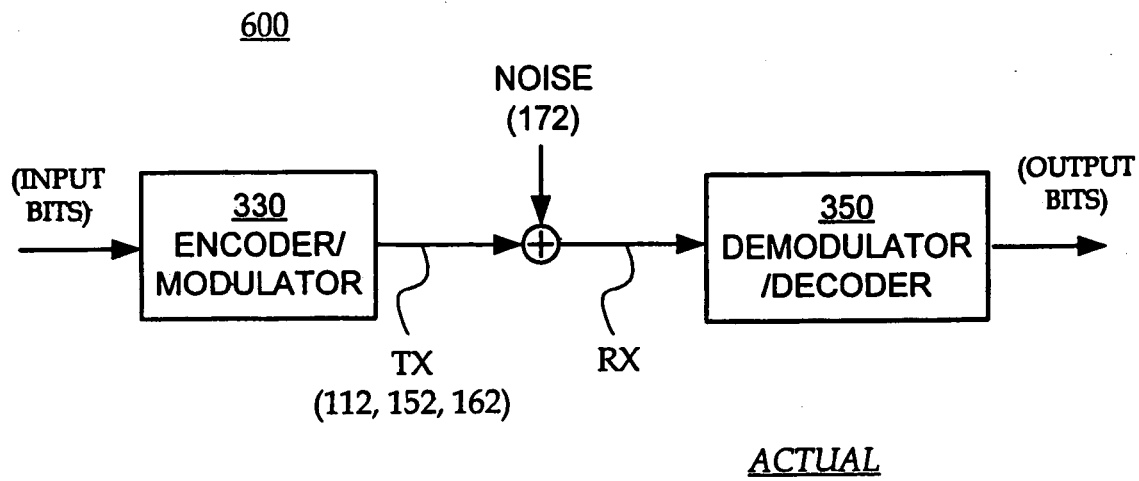
FIG. 6 is a diagram illustrating a model of actual transmission and reception for the system of FIG. 1.

FIG. 6 is a diagram illustrating a model 600 of actual transmission and reception for the system of FIG. 1. Model 600 is rather similar to model 300 of FIG. 3, except that noise is added to transmitted signal TX, and incorporated in received signal RX. The noise may be from wave 172 of FIG. 1. Model 600 is more realistic than model 300 in actual practice.

Figure 7:
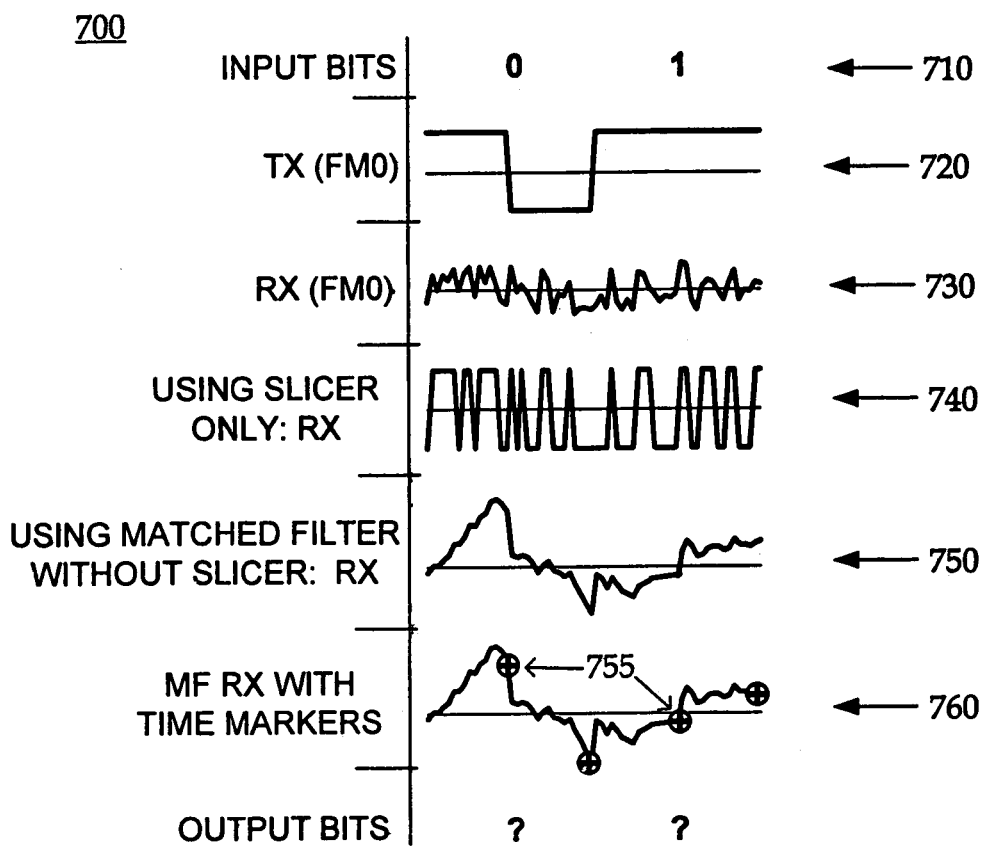
FIG. 7 is a table showing how input bits are transmitted and received to generate an analog signal for interpretation by a receiving channel according to the model of FIG. 6.

FIG. 7 is a table 700 showing how a sequence 710 of input bits ("01") are transmitted and received. A transmission signal TX (FM0) is generated, having a waveform 720, similar to waveform 520. A corresponding received signal RX (FM0) is shown as waveform 730. If a slicer were used at this stage at demodulator/decoder 350, then a waveform 740 would result, which would be useless for further decoding. If, however, a matched filter, such as matched filter 260 of FIG. 2 is used without a slicer before it, then an analog RX signal would result, having a waveform 750. Time markers 755 are then applied at suitable time intervals, resulting in waveform 760. It is desired to extract the output bits, by interpreting waveform 760. Two examples are described below for this purpose.

Figure 8:
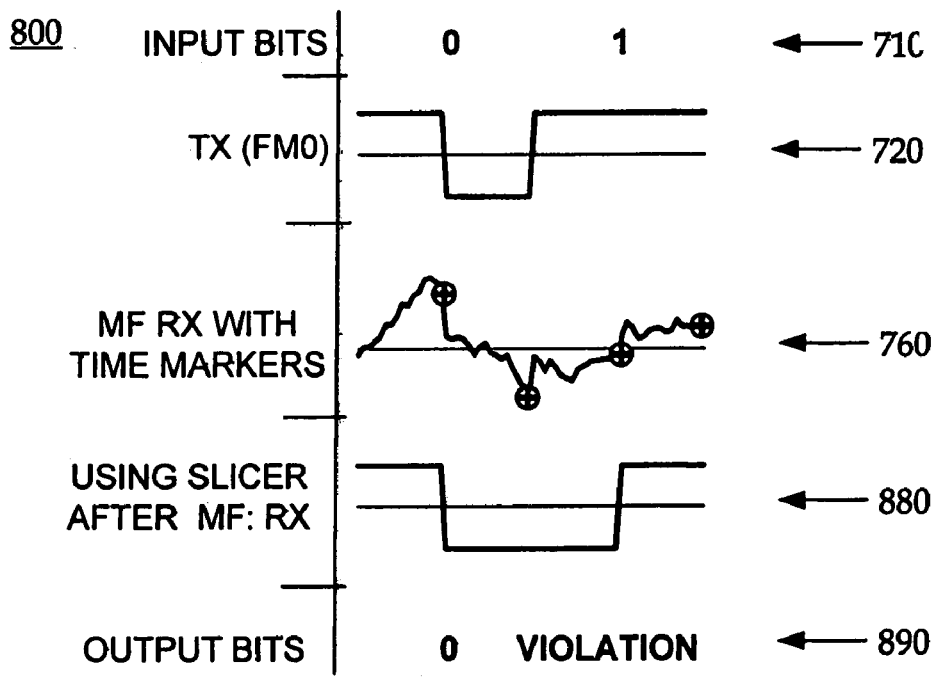
FIG. 8 is a table showing how the analog signal of FIG. 7 can be interpreted incorrectly by a receiving channel that includes a decoder with no memory.

FIG. 8 is a table 800 showing a way for waveform 760 of FIG. 7 to be interpreted. Waveform 760 may be applied to a decoder that only includes a slicer, as was done for the ideal case of FIG. 3. The resulting sample can be represented by waveform 880, which is in turn interpreted as a series 890 ("0 VIOLATION"). The "VIOLATION" symbol occurs because after the "0", which in this case ends in a low, a waveform should follow that starts with a transition to high, as per FIG. 4B. The next symbol in series 890, however, remains low, which is a violation. It will be observed that the resulting series 890 is not the same as input series 710, and therefore waveform 760 was interpreted incorrectly.

Figure 9:
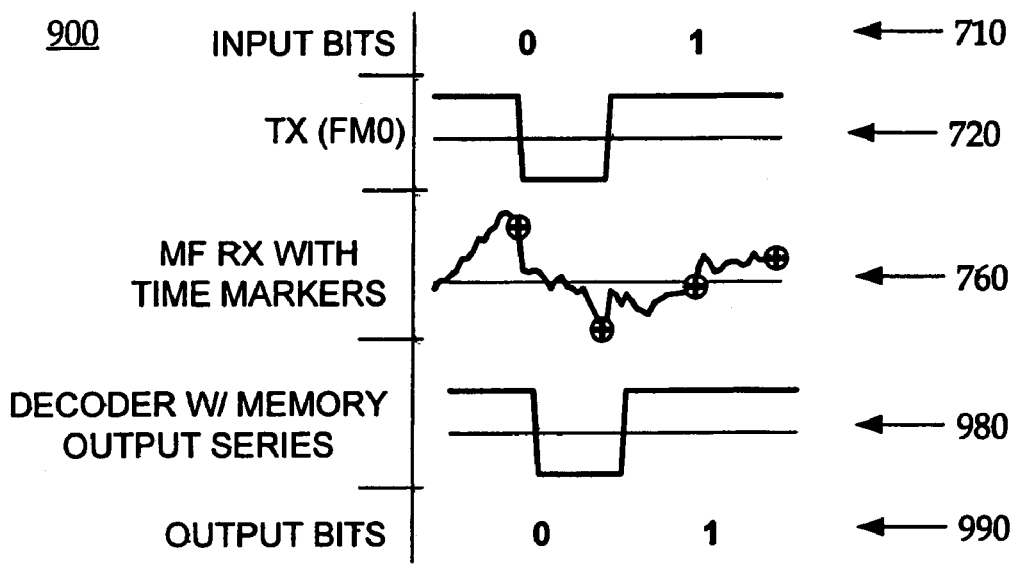
FIG. 9 is a table showing the analog signal of FIG. 7 being interpreted correctly by the receiving channel of FIG. 2.

FIG. 9 is a table 900 showing how waveform 760 of FIG. 7 is interpreted according to the invention. A waveform 980 results when a decoder with memory is used, such as decoder 270 of the invention. It will be understood that waveform 980 is an aggregate representation of samples, which in turn may be an electrical signal, pulses, or just numbers with values that can be plotted as substantially as waveform 980. From waveform 980, an output series 990 ("01") may be derived, which is similar to input sequence 710, as was desired. Generation of waveform 980 will now be described in more detail.

Figure 10A:
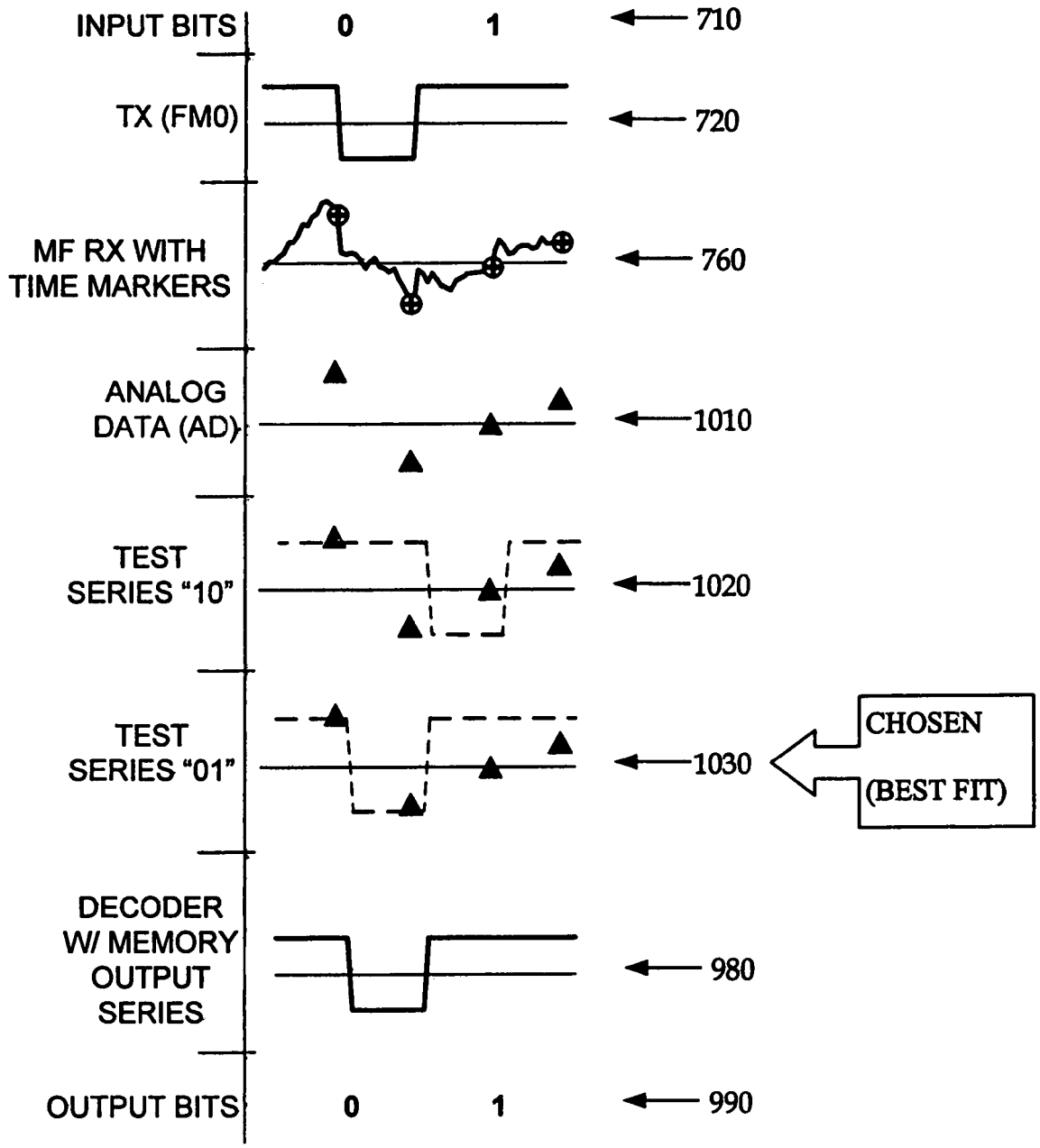
FIG. 10A is a table showing in more detail how the table of FIG. 9 is derived.

FIG. 10A is a table 1000-A showing in more detail how the table of FIG. 9 is derived. First, a set 1010 of analog data AD is extracted from waveform 760. This is accomplished by reading the value of waveform 860 only during the time markers.

Decoder 270 then generates test series 1020, 1030 of successive samples, in an attempt to match set 1010 of the received analog data. Here, test series 1020 is shown superimposed over set 1010 of analog data AD, and corresponds to "10". Also, test series 1030 is shown superimposed over set 1010 of analog data AD, and corresponds to "01". The samples of test series 1020, 1030 may be implemented in any convenient form to correspond to analog data AD, for example they may be pulses, waveform segments, numbers, and so on. While only two test series 1020, 1030 are shown, such is by example and not by limitation.

Test series 1020, 1030 preferably meet preset validity criteria. In some embodiments, they form sequences that would be valid while encoding.

In some embodiments, a memory of samples may be used to form subsequent samples. For example, both test series 1020, 1030 are for two digits. In both cases, the latter one of the samples has a value that depends on a value of the earlier sample in the same series. In test series "10", the "0" starts with a transition to low, because the previous "1" ends high, and in test series "01", the "1" starts with a transition to high, because the previous "0" ends low.

Decoder 270 is further adapted to compare test series 1020, 1030, and to select the one that represents the best fit with set 1010 of analog data AD. As can be seen, series 1030 (test series "01") is indicated as the best fit in FIG. 10A. The selected test series (here waveform 1030) is output as waveform 980, which was first described in FIG. 9.

There are a number of ways for determining which one of test series 1020, 1030 represents the best fit. One such way is described immediately below.

In some embodiments, decoder 270 is adapted to compute a distance metric for each of the test series 1020, 1030 with respect to set 1010 of analog data AD. A number of different distance metrics may be chosen.

In some of those embodiments, the chosen distance metric is computed from a sum, which is aggregated from individual differences of values of the samples from the corresponding analog data. In one of those embodiments, the sum is of the absolute values of the differences. In another embodiment, the sum is of the squared values of the differences.

Decoder 270 is further adapted to select one of the metrics, and thus select the test series corresponding to the selected metric. An example follows.

Figure 10B:
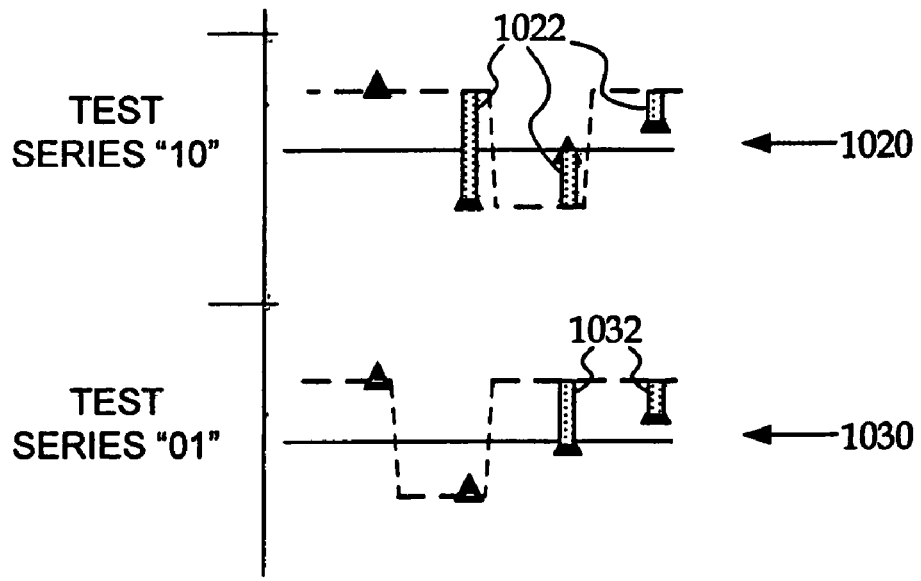
FIG. 10B is a table showing a detail of FIG. 10A, with additional markings for deciding the best fit.

FIG. 10B is a table 1000-B showing a detail of FIG. 10A, with additional markings for deciding the best fit. Markings 1022 designate the distance between analog data set 1010 and test series "10", which is designated as waveform 1020. Plus, markings 1032 designate the absolute value of the distance between analog data set 1010 and test series "01", which is designated as waveform 1030. In either case, additional markings 1022, 1032 do not preserve their polarity, and thus stand for the absolute value of the differences.

Figure 10C:
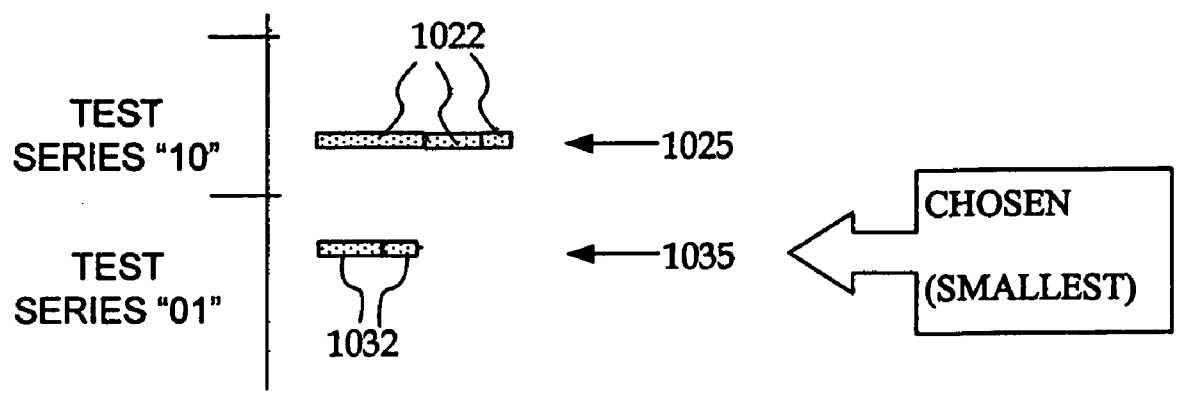
FIG. 10C is a table showing the additional markings of FIG. 10B being compared for deciding the best fit.

FIG. 10C is a table 1000-C showing the additional markings of FIG. 10B being compared for deciding the best fit. A bar 1025 is formed by summing individual markings 1022, and a bar 1035 is formed by summing individual markings 1032. Bars 1025, 1035 form a visualization of the chosen distance metric, which here is the sum of the absolute values of the differences. It is readily observed that bar 1035 is smaller than bar 1025, and therefore it is chosen. This means that test series "01" is chosen as a better fit to analog data set 1010, than test series "10".

FIG. 11 is a block diagram of a receiving channel 1110 of an RFID reader and/or RFID tag according to additional embodiments of the invention. For example, receiving channel 1110 could be implemented in any one of RFID reader 110 and RFID tags 150, 160.

Receiving channel 1110 includes matched filter 260 and decoder 270, as described above. Matched filter 260 receives data RX from an antenna (not shown in FIG. 11).

In addition, receiving channel 1110 includes a module 1160 to compute a Received Signal Strength Indicator (RSSI) from the received analog data AD sequence. Moreover, receiving channel 1110 includes another module 1180, which may output a collision indicator.

FIG. 12 is a truth table 1200 for when module 1180 of FIG. 11 outputs the collision indicator. Module 1180 outputs a detected collision if the computed RSSI is high, and if the selected metric of the chosen distance metric is also high.

FIG. 13 is a diagram of a circuit 1300 for implementing truth table 1200 of FIG. 12, and thus also module 1180 of FIG. 11. Circuit 1200 includes two comparators 1320. A first one of comparators 1320 compares the computed RSSI to a preset RSSI threshold $T_{RSSI}$, and a second one of comparators 1320 compares the chosen distance metric CDM to a preset metric threshold $T_{CDM}$. In addition, an AND gate 1330 receives the outputs of comparators 1320. Accordingly, circuit 1300 outputs a detected collision if the computed RSSI exceeds the RSSI threshold, and if the chosen distance metric exceeds the metric threshold.

The present invention may be implemented by one or more devices that include logic circuitry, whether these devices are RFID tags or readers themselves, or cooperate with such. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer. Alternately, the device may be implemented an Application Specific Integrated Circuit (ASIC), etc.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 14:
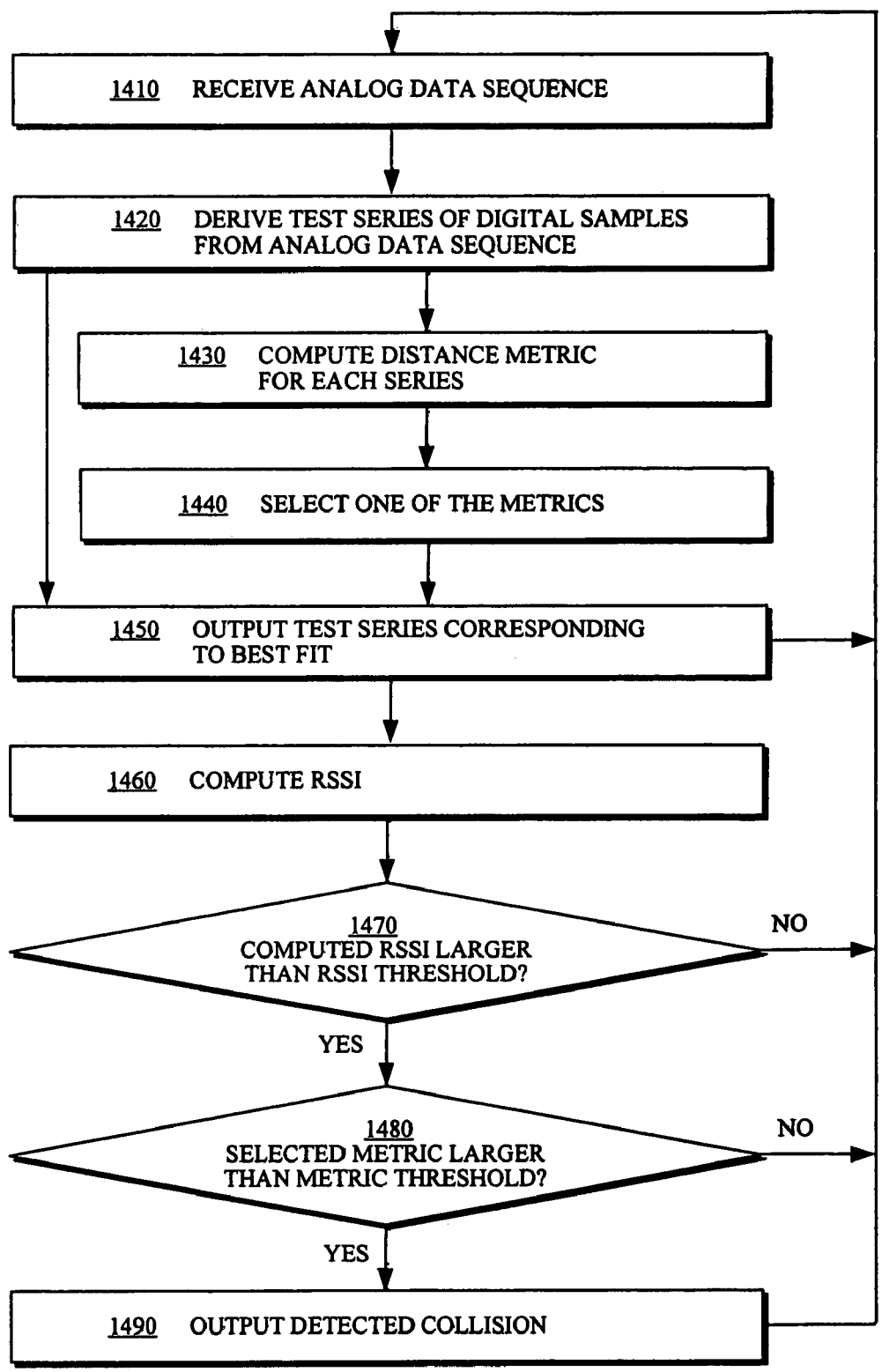
FIG. 14 is a flowchart illustrating a method according to an embodiment of the present invention.

FIG. 14 is flowchart 1400 illustrating a method according to an embodiment of the invention. The method of flowchart 1400 may be practiced by different embodiments of the invention, including but not limited to the devices of system 100.

At block 1410, an analog data sequence is received, such as sequence AD.

At next block 1420, test series are derived of digital samples from the analog data sequence, such as series 1020, 1030.

At optional next block 1430, a distance metric is computed for each of the test series. The distance metric may be computed as also per the above.

If block 1430 is executed, then at next block 1440, one of the metrics is selected. Preferably, the metric that is selected is the one indicating the best fit, as also per the above.

At optional next block 1450, one of the test series is outputted that corresponds to the best fit. If blocks 1430, 1440 have also been executed, then the outputted test series is the one that corresponds to the selected metric.

At optional next block 1460, the RSSI is computed from the analog data. At next block 1470, it is determined whether the computed RSSI is larger than a preset RSSI threshold. If not, execution returns to block 1410.

If yes, then at next block 1480, it is determined whether the metric selected at box 1440 is larger than a preset metric threshold. If not, execution returns to block 1410.

If yes, then at next block 1490, a detected collision is output. Execution returns to block 1410.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A radio frequency identification (RFID) tag comprising:
an antenna to receive a wireless signal;
a matched filter to derive a set of analog signal data from the wireless signal; and
a decoder that is adapted to compare at least two test series of successive samples that correspond to the analog data, and to select one of the test series for outputting.

2. The tag of claim 1, wherein the series meet preset validity criteria.

3. The tag of claim 1, wherein the selected series is the one with the best fit with the set of analog data.

4. The tag of claim 1, wherein
a first one of the samples has a value that depends on a value of a second one of the samples that occurs before the first sample in the same series.

5. The tag of claim 1, wherein the decoder is adapted to compute a distance metric for each of the series with respect to the set,
select one of the metrics, and
select for outputting the series corresponding to the selected metric.

6. The tag of claim 5, wherein
the distance metric is computed from a sum aggregated from individual differences of values of the samples from the corresponding analog data.

7. The tag of claim 6, wherein the sum is of the absolute values of the differences.

8. The tag of claim 6, wherein the sum is of the squared values of the differences.

9. The tag of claim 6, wherein the selected metric is the one corresponding to the smallest sum.

10. The tag of claim 5, further comprising:
a first module to compute a Received Signal Strength Indicator (RSSI) from the received analog data set; and
a second module to output a detected collision if the computed RSSI exceeds a preset RSSI threshold and the selected metric exceeds a preset metric threshold.

11. The tag of claim 10, wherein the second module includes:

a first comparator to compare the computed RSSI to the RSSI threshold; and
a second comparator to compare the selected metric to the metric threshold.

12. An article comprising:
a storage medium, the storage medium having instructions stored thereon, in which when the instructions are executed by at least one device, they result in:
receiving a set of analog data;
deriving from the set at least two test series of successive samples that correspond to the analog data;
computing a distance metric for each of the test series with respect to the set;
selecting one of the metrics; and
outputting the test series corresponding to the selected metric.

13. The article of claim 12, wherein the series meet preset validity criteria.

14. The article of claim 12, wherein the output series is the one with the best fit with the set of analog data.

15. The article of claim 12, wherein
a first one of the samples has a value that depends on a value of a second one of the samples that occurs before the first sample in the same series.

16. The article of claim 12, wherein
the distance metric is computed from a sum aggregated from individual differences of values of the samples from the corresponding analog data.

17. The article of claim 16, wherein the sum is of the absolute values of the differences.

18. The article of claim 16, wherein the sum is of the squared values of the differences.

19. The article of claim 16, wherein the selected metric is the one corresponding to the smallest sum.

20. The article of claim 12, in which executing the instructions further results in:
computing a Received Signal Strength Indicator (RSSI) from the received analog data set; and
outputting a detected collision if the computed RSSI exceeds a preset RSSI threshold and if the selected metric exceeds a preset metric threshold.

21. The article of claim 20, in which executing the instructions further results in:
comparing the computed RSSI to the RSSI threshold.

22. The article of claim 20, in which executing the instructions further results in:
comparing the selected metric to the metric threshold.

* * * * *